United States Patent [19]
Oldenburg et al.

[11] 3,826,388
[45] July 30, 1974

[54] WHEEL/TRACK LOADER

[75] Inventors: Dorrance Oldenburg, Peoria; James Robert Sturges, Washington, both of Ill.

[73] Assignee: Caterpillar Tractor Co., Peoria, Ill.

[22] Filed: Aug. 16, 1971

[21] Appl. No.: 171,916

[52] U.S. Cl.................................. 214/140, 180/9.44
[51] Int. Cl............................................. E02f 3/00
[58] Field of Search....... 180/49, 50, 51, 9.44, 9.34; 214/140

[56] References Cited
UNITED STATES PATENTS
1,383,425    7/1921    Ray................................ 180/9.34
3,435,908    4/1969    Sunderlin....................... 180/9.44

FOREIGN PATENTS OR APPLICATIONS
925,032    5/1963    Great Britain.................... 180/9.44

*Primary Examiner*—Robert G. Sheridan
*Assistant Examiner*—John Mannix
*Attorney, Agent, or Firm*—Phillips, Moore, Weissenberger, Lempio & Strabala

[57] ABSTRACT

A loader vehicle rides on a set of track assemblies and a set of wheels and is articulated at the mid-point between the wheel assembly and the track assembly.

1 Claim, 3 Drawing Figures

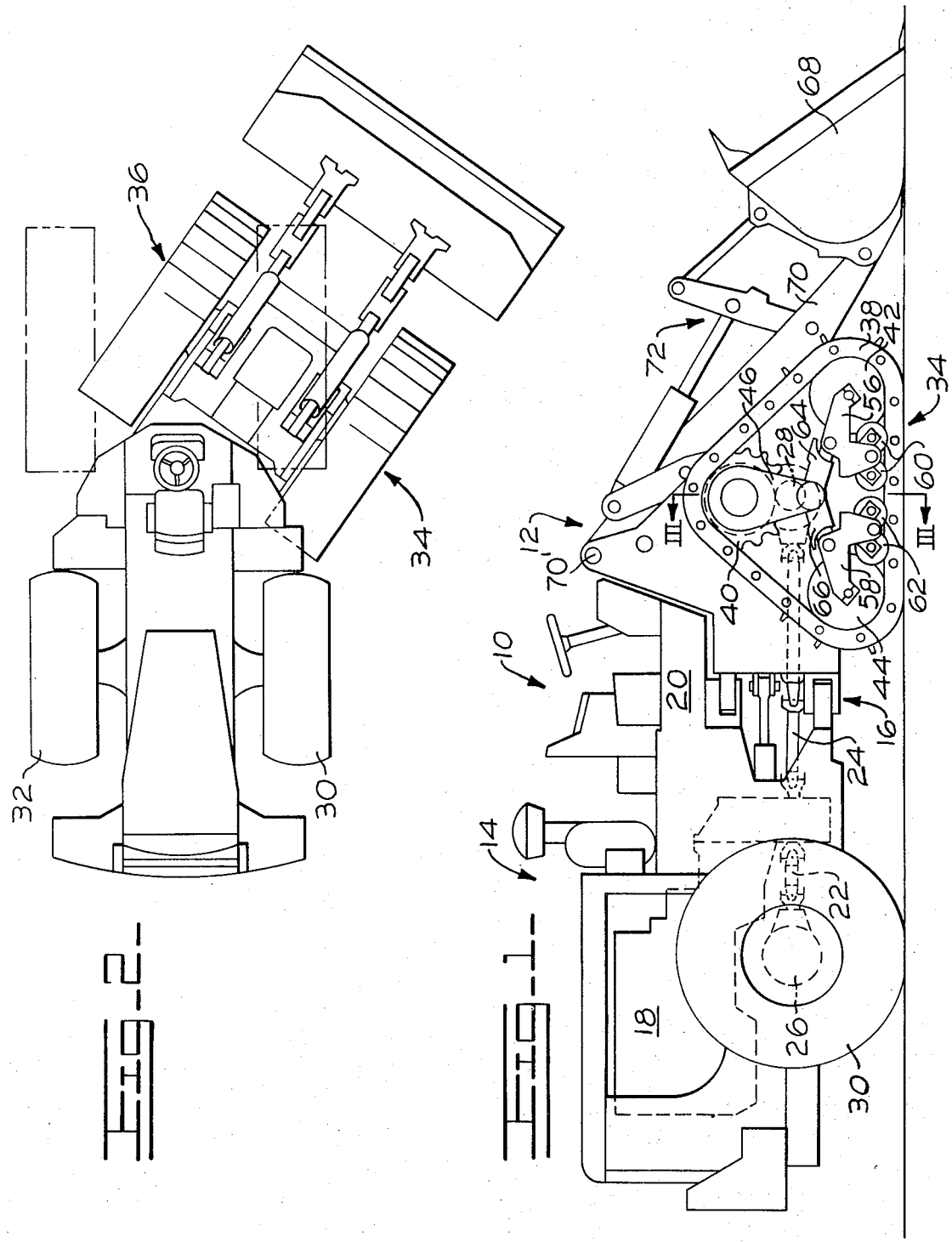
INVENTORS
DORRANCE OLDENBURG
JAMES R. STURGES

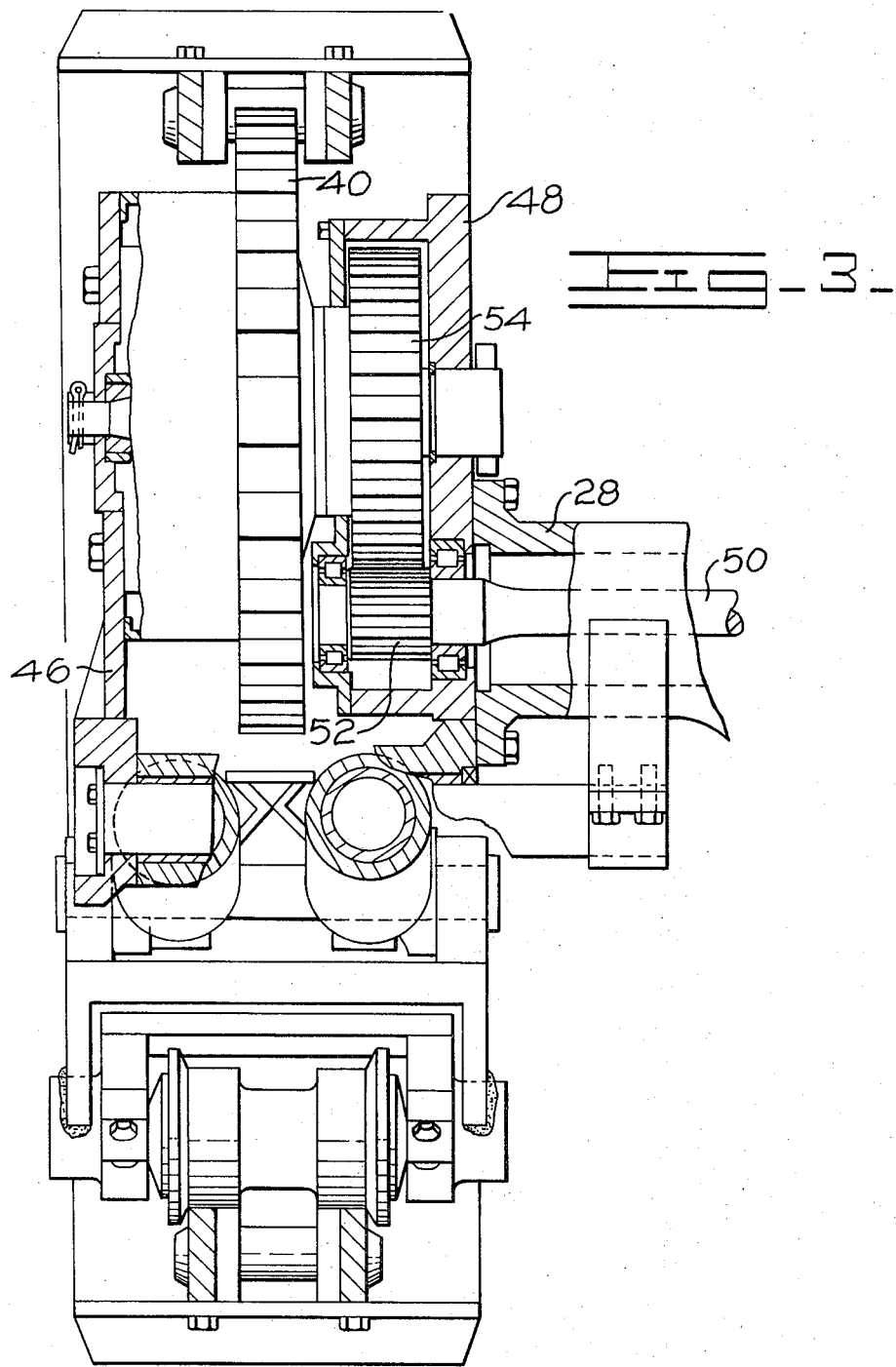

WHEEL/TRACK LOADER

BACKGROUND OF THE INVENTION

The present invention relates to powered vehicles and pertains more particularly to articulated tractor vehicles referred to as hybrid track and wheel vehicles.

A number of major problems associated with many prior art tractors when equipped as a loader are set forth in U.S. Pat. No. 3,435,908 issued April, 1969, to D. E. Sunderlin et al and entitled "Articulated Crawler Tractor Construction." Other examples of earlier prior art constructions are shown by the following United States patents:

1,254,819 issued Jan. 29, 1918
1,356,038 issued Oct. 19, 1920
1,383,425 issued July 5, 1921
1,416,329 issued May 16, 1922
2,310,775 issued Feb. 9, 1943

None of these prior art constructions relate to loaders and thus are not faced with the peculiar problems associated therewith. Therefore, the unique arrangement as proposed by the present invention was not heretofore apparent.

The invention of the above-referenced U.S. Pat. No. 3,435,908 was devised to overcome numerous disadvantages of the prior art. However, that construction has some disadvantages to which the present invention is devised to overcome. For example, track drives induce considerable vibration in a vehicle, cause operator discomfort, and thus hamper machine productivity. Furthermore, while track drives are advantageous at the front of such loaders, they may be undesirable at the rear in that they initiate vibration affecting the operator, in addition to adding undesirable weight and complexity to the vehicle.

SUMMARY OF THE INVENTION

It is a primary object of the present invention to provide a hybrid track and wheel vehicle that retains the major advantages of track vehicles as well as the advantages of a wheel vehicle.

Another object of the present invention is to provide a loader vehicle having the advantages of stability and high speed operation over rough terrain.

A further object of the present invention is to provide a loader vehicle having the stability and effectiveness of a track vehicle and yet provide cushioned support for the rear section so that the operator is substantially isolated from road shock.

In accordance with the present invention, a center articulated loader vehicle is provided with powered wheels on one end of the vehicle and with powered tracks on the end which supports the load manipulating means.

BRIEF DESCRIPTION OF THE DRAWINGS

The above and other objects and advantages of the present invention will become apparent from the following specification when read in conjunction with the drawings wherein:

FIG. 1 is an elevational view of a vehicle constructed in accordance with the present invention;

FIG. 2 is a plan view of the embodiment of FIG. 1;

FIG. 3 is a sectional view taken generally along lines III—III of FIG. 1.

DETAILED DESCRIPTION OF PREFERRED EMBODIMENT

Referring now to the drawings and in particular to FIG. 1, there is illustrated an articulated loader vehicle generally designated by the numeral 10 comprising a front body section 12 and a rear body section 14 hinged together by means of a suitable pivotal coupling 16 located substantially at the center of the vehicle. The vehicle engine 18 is carried by the rear body section of the vehicle which also carries an operator station on a forwardly extending platorm 20 for positioning the operator substantially above the pivotal coupling 16. The engine 18 is operatively coupled by suitable means such as drive shafts 22 and 24 for driving a rear axle 26 and a front axle 28, respectively. The rear drive axle 26 is operatively connected for driving a pair of wheels 30 and 32 which may be conventional in form and serves to support the rear body section. The front drive axle 28 is operatively connected for driving a pair of triangular track assemblies 34 and 36.

The triangular track assembly comprises an endless track 38 trained about a drive sprocket 40 and a pair of idlers 42 and 44 for supporting the track in a generally triangular configuration. This arrangement provides an advantage in having an elongated supporting area between idler wheels 42 and 44 in engagement with the ground for support of the vehicle and load. The provision of a drive pulley 40 disposed upward a significant distance from the ground-engaging portion of the track eliminates a great deal of contamination of the track sprockets by dust and soil through which it travels.

The track assembly, as more clearly shown in FIG. 3, comprises a track support frame 46, including a gear housing 48 supported from a front drive axle 28. A drive shaft 50 including a drive pinion 52 is operatively coupled to drive gear 54 and drive sprocket 40. The idler wheels 42 and 44 are supported on a pair of bogies 56 and 58, each of which carry a pair of rollers 60 and 62, respectively. The bogies 56 and 58 are operatively connected by means of recoil mechanisms 64 and 66 to the track support frame 46. Load manipulating means such as a load-carrying bucket 68 is pivotally carried on the forward or front body section of the vehicle by means of arms 70 pivotally mounted at 70' and including tilt control linkage 72 for controlling the inclination of the bucket 68 with respect to the support arm 70. The pivot 70' is disposed above and between the idler rollers 42, 44.

This unique combination of arrangement for a loader vehicle having front track drive combined with rear tire wheel drive and a center articulated body provides significant advantages not heretofore known over pure wheel loaders and pure track loaders. For example, the track arrangement provides a very broad area of support where the tracks engage the ground for supporting the loaded front portion of the vehicle. The front track also provides considerably improved traction over front wheels as well as providing improved stability in that it minimizes bounce and tire deflection, which are inherent in wheel loaders.

The rear drive wheels, together with the main articulation pivot provide damping which isolates road shock and vibration inherent in most track vehicles and thus provides an improved arrangement both from an engineering standpoint and an operating standpoint. This arrangement, providing such damping means, allows higher operating speed over rough terrain than either the track loader or the wheel loader. Because of their more efficient rolling action, the rear wheels facilitate steering of the vehicle as well as provide a smoother ride. The rear wheels are also driven through a power train at the same speeds as the track, and therefore spinning and high wear of the tires are minimized. The present arrangement also provides more favorable economics in that the combination wheel and track drive provides a considerably less expensive arrangement than a four track drive.

While the present invention has been described with respect to a specific embodiment, it is to be understood that numerous changes and modifications may be made in the illustrated embodiments without departing from the spirit and scope of the present invention as defined in the appended claims.

What is claimed is:

1. An articulated loader vehicle, said vehicle comprising: a forward body section having a powered front axle; a rearward body section having a powered rear axle; a pivot joint connecting said forward section and said rearward section together for pivotal movement about a vertical axis disposed substantially at the center of said vehicle; an engine mounted on said rearward section and operatively connected to means for driving said front and said rear axles; a pair of endless tracks mounted on opposite ends of said front axle and operatively connected to be driven thereby; each of said tracks being triangular in configuration with the base of said triangle engaging the ground, and with the drive to said tracks being at the apex of said triangle; a pair of wheels mounted on opposite ends of said rear axle and operatively connected to be driven thereby; supports arms, means pivotally mounting said arms on said forward body section, said pivot means being disposed between the forward and rearward end of said triangle base; and a loader bucket mounted on said support arms opposite said pivot means whereby loads carried by said vehicle are supported by said tracks.

* * * * *